United States Patent
Lesso

(10) Patent No.: US 11,894,000 B2
(45) Date of Patent: *Feb. 6, 2024

(54) AUTHENTICATING RECEIVED SPEECH

(71) Applicant: Cirrus Logic International Semiconductor Ltd., Edinburgh (GB)

(72) Inventor: John P. Lesso, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,698

(22) Filed: Apr. 15, 2022

(65) Prior Publication Data

US 2022/0238121 A1    Jul. 28, 2022

Related U.S. Application Data

(63) Continuation of application No. 16/880,066, filed on May 21, 2020, now Pat. No. 11,341,974.

(51) Int. Cl.
*G10L 17/22* (2013.01)
*G10L 17/06* (2013.01)
(Continued)

(52) U.S. Cl.
CPC ............... *G10L 17/22* (2013.01); *G10L 17/06* (2013.01); *G10L 17/10* (2013.01); *G10L 17/26* (2013.01); *G10L 25/06* (2013.01)

(58) Field of Classification Search
CPC .......... G10L 17/22; G10L 17/06; G10L 17/10
(Continued)

(56) References Cited

U.S. PATENT DOCUMENTS

| 5,548,647 | A * | 8/1996 | Naik ..................... G10L 17/02 |
| | | | 340/5.52 |
| 10,580,411 | B2 * | 3/2020 | Li ........................... G01S 5/18 |

(Continued)

FOREIGN PATENT DOCUMENTS

| WO | 2019145708 A1 | 8/2019 |
| WO | 2021123710 A1 | 6/2021 |

OTHER PUBLICATIONS

International Search Report and Written Opinion of the International Searching Authority, International Application No. PCT/GB2021/050908, dated Jul. 15, 2021.

*Primary Examiner* — Edwin S Leland, III
(74) *Attorney, Agent, or Firm* — Jackson Walker L.L.P

(57) ABSTRACT

A speech signal is received by a device comprising first and second transducers, and the first transducer comprises a microphone. A method comprises performing a first voice biometric process on speech contained in a first part of a signal received by the microphone, in order to determine whether the speech is the speech of an enrolled user. A first correlation is determined, between said first part of the signal received by the microphone and a corresponding part of the signal received by the second transducer. A second correlation is determined, between said second part of the signal received by the microphone and the corresponding part of the signal received by the second transducer. It is then determined whether the first correlation and the second correlation satisfy a predetermined condition. If it is determined that the speech contained in the first part of the received signal is the speech of an enrolled user and that the first correlation and the second correlation satisfy the predetermined condition, the received speech signal is authenticated.

20 Claims, 16 Drawing Sheets

(51) Int. Cl.
*G10L 17/10* (2013.01)
*G10L 17/26* (2013.01)
*G10L 25/06* (2013.01)

(58) Field of Classification Search
USPC .......................................................... 704/237
See application file for complete search history.

(56) References Cited

U.S. PATENT DOCUMENTS

| | | | |
|---|---|---|---|
| 10,692,490 B2 | 6/2020 | Lesso et al. | |
| 10,839,808 B2* | 11/2020 | Lesso | H04R 3/005 |
| 11,276,409 B2* | 3/2022 | Lesso | G10L 17/26 |
| 2010/0131279 A1* | 5/2010 | Pilz | H04L 63/0861 |
| | | | 726/28 |
| 2011/0096915 A1* | 4/2011 | Nemer | H04M 3/568 |
| | | | 379/158 |
| 2017/0094223 A1* | 3/2017 | Burenius | H04N 7/147 |
| 2018/0324518 A1* | 11/2018 | Dusan | G10L 25/06 |
| 2019/0147852 A1* | 5/2019 | Bakish | G10L 15/07 |
| | | | 704/231 |
| 2019/0147888 A1* | 5/2019 | Lesso | G10L 17/06 |
| | | | 340/5.84 |
| 2019/0295554 A1* | 9/2019 | Lesso | G10L 17/04 |
| 2020/0075028 A1* | 3/2020 | Lesso | G10L 17/00 |
| 2020/0184057 A1* | 6/2020 | Mukund | H04R 1/08 |
| 2021/0366492 A1 | 11/2021 | Lesso | |
| 2022/0342477 A1* | 10/2022 | Ross | G10L 17/22 |

\* cited by examiner

AUTHENTICATING RECEIVED SPEECH

The present application is a continuation of U.S. patent application Ser. No. 16/880,066, filed May 21, 2020, which is incorporated by reference herein in its entirety.

TECHNICAL FIELD

Embodiments described herein relate to methods and devices for authenticating a received speech signal.

BACKGROUND

Speech recognition systems are known, allowing a user to control a device or system using spoken commands. It is common to use speaker recognition systems in conjunction with speech recognition systems. A speaker recognition system can be used to verify the identity of a person who is speaking, and this can be used to control the operation of the speech recognition system.

As an illustration of this, a spoken command may relate to the personal tastes of the speaker. For example, the spoken command may be "Play my favourite music", in which case it is necessary to know the identity of the speaker before it is possible to determine which music should be played.

As another illustration, a spoken command may relate to a financial transaction. For example, the spoken command may be an instruction that involves transferring money to a specific recipient. In that case, before acting on the spoken command, it is necessary to have a high degree of confidence that the command was spoken by the presumed speaker.

Speaker recognition systems often use a voice biometric, where the received speech is compared with a model generated when a person enrols with the system.

Many voice-activated devices require the user to speak a predetermined trigger phrase, in order to wake the system from a low-power mode, in order that speech recognition can be performed. It is possible to perform speaker recognition on the speech signal that corresponds to the predetermined trigger phrase, and this speaker recognition process is relatively reliable, because the user will typically have been required to utter the predetermined trigger phrase during the enrolment process. This is referred to as a text-dependent speaker recognition process. Therefore, when the user speaks the predetermined trigger phrase to wake the system, it can be expected that the speech will closely resemble the speech during the enrolment.

However, it is more difficult to perform speaker recognition on the command that follows the predetermined trigger phrase, because the user will typically be speaking a phrase that will not have been uttered during the enrolment process. This is referred to as a text-independent speaker recognition process.

SUMMARY

According to a first aspect of the invention, there is provided a method of authenticating a speech signal received by a device comprising first and second transducers, wherein the first transducer comprises a microphone. The method comprises: performing a first voice biometric process on speech contained in a first part of a signal received by the microphone, in order to determine whether the speech is the speech of an enrolled user; determining a first correlation between said first part of the signal received by the microphone and a corresponding part of the signal received by the second transducer; determining a second correlation between said second part of the signal received by the microphone and the corresponding part of the signal received by the second transducer; and determining whether the first correlation and the second correlation satisfy a predetermined condition; and, if it is determined that the speech contained in the first part of the received signal is the speech of an enrolled user and that the first correlation and the second correlation satisfy the predetermined condition, authenticating the received speech signal.

According to a second aspect of the invention, there is provided a system for authenticating a speech signal received by a device comprising first and second transducers, wherein the first transducer comprises a microphone. The system comprises: at least one input for receiving signals generated by the microphone and by the second transducer; and a processor configured for performing a method comprising: performing a first voice biometric process on speech contained in a first part of the signal generated by the microphone, in order to determine whether the speech is the speech of an enrolled user; determining a first correlation between said first part of the signal generated by the microphone and a corresponding part of the signal generated by the second transducer; determining a second correlation between said second part of the signal generated by the microphone and the corresponding part of the signal generated by the second transducer; and determining whether the first correlation and the second correlation satisfy a predetermined condition; and, if it is determined that the speech contained in the first part of the received signal is the speech of an enrolled user and that the first correlation and the second correlation satisfy the predetermined condition, authenticating the received speech signal.

According to a third aspect of the invention, there is provided a computer program product, comprising machine readable code containing instructions for causing an audio processing circuit to perform a method according to the first aspect.

BRIEF DESCRIPTION OF DRAWINGS

For a better understanding of the present invention, and to show how it may be put into effect, reference will now be made to the accompanying drawings, in which:—

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The methods described herein may be implemented in a wide range of devices and systems. However, for ease of explanation of one embodiment, an illustrative example will be described, in which the implementation occurs in a host device, which is used with a wearable accessory. However, in other embodiments, the implementation may occur in a wearable device such as a headset.

Figure 1:
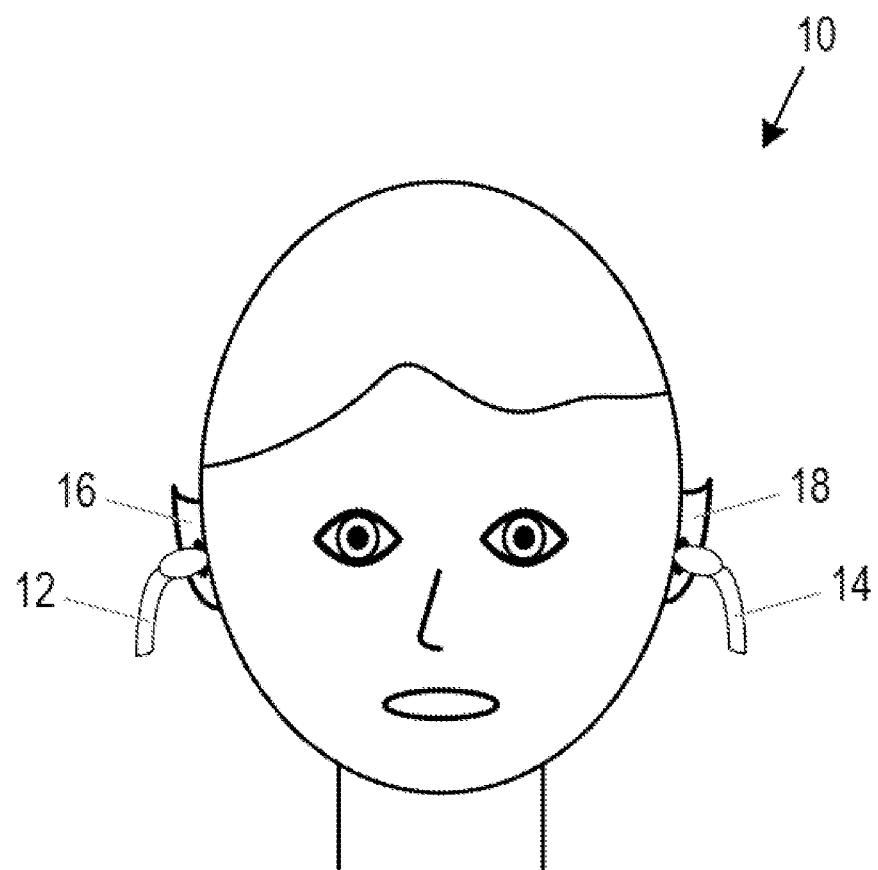
FIG. 1 illustrates an example of a device being worn by a user.

FIG. 1 illustrates an example of a device being worn by a user.

Specifically, FIG. 1 illustrates a person wearing an earphone. More specifically, FIG. 1 shows a person 10, wearing one wireless earbud 12, 14 in each ear 16, 18.

Although this shows a person wearing two earbuds, the method is applicable when only one earbud is being worn.

In addition, although FIG. 1 shows a person wearing wireless earbuds, the method is applicable to any wired or wireless earbuds or earphones, for example in-ear earphones, supra-aural earphones, or supra-concha earphones.

Moreover, the method is applicable to any wearable device, such as smart glasses.

Figure 2:
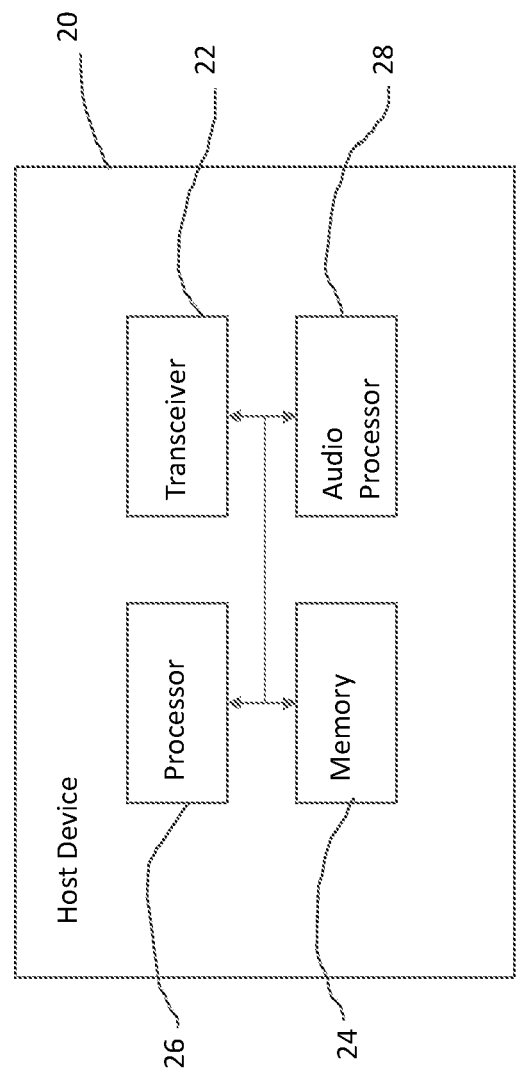
FIG. 2 is a schematic diagram, illustrating the form of a host device.

FIG. 2 is a schematic diagram, illustrating the form of a host device 20.

The host device 20 may for example take the form of a smartphone, a laptop or tablet computer, a smart speaker, a games console, a home control system, a home entertainment system, an in-vehicle entertainment system, a domestic appliance, or any other suitable device.

Specifically, FIG. 2 shows various interconnected components of the host device 20. It will be appreciated that the host device 20 will in practice contain many other components, but the following description is sufficient for an understanding of embodiments of the present disclosure.

Thus, FIG. 2 shows a transceiver 22, which is provided for allowing the host device 20 to communicate with other devices. Specifically, the transceiver 22 may include circuitry for communicating over a short-range wireless link with an accessory, such as the accessory shown in FIG. 1. In addition, the transceiver 22 may include circuitry for establishing an internet connection either over a WiFi local area network or over a cellular network.

FIG. 2 also shows a memory 24, which may in practice be provided as a single component or as multiple components. The memory 24 is provided for storing data and program instructions.

FIG. 2 also shows a processor 26, which again may in practice be provided as a single component or as multiple components. For example, one component of the processor 26 may be an applications processor when the host device 20 is a smartphone.

FIG. 2 also shows audio processing circuitry 28, for performing operations on received audio signals as required. For example, the audio processing circuitry 28 may filter the audio signals or perform other signal processing operations.

In this embodiment, the host device 20 is provided with voice biometric functionality, and with control functionality. Thus, the host device 20 is able to perform various functions in response to spoken commands from an enrolled user. The biometric functionality is able to distinguish between spoken commands from the enrolled user, and the same commands when spoken by a different person. Thus, certain embodiments of the present disclosure relate to operation of a smartphone or another portable electronic host device with some sort of voice operability, in which the voice biometric functionality is performed in the host device that is intended to carry out the spoken command. Certain other embodiments relate to systems in which the voice biometric functionality is performed on a smartphone or other host device, which then transmits the commands to a separate device if the voice biometric functionality is able to confirm that the speaker was the enrolled user.

In some embodiments, while voice biometric functionality is performed on the host device 20 or other device that is located close to the user, the spoken commands are transmitted using the transceiver 22 to a remote speech recognition system, which determines the meaning of the spoken commands. For example, the speech recognition system may be located on one or more remote server in a cloud computing environment. Signals based on the meaning of the spoken commands are then returned to the host device 20 or other local device.

In other embodiments, a first part of the voice biometric functionality is performed on the host device 20 or other device that is located close to the user. Then, as described in more detail below, a signal may be transmitted using the transceiver 22 to a remote system, which performs a second part of the voice biometric functionality.

Figure 3:
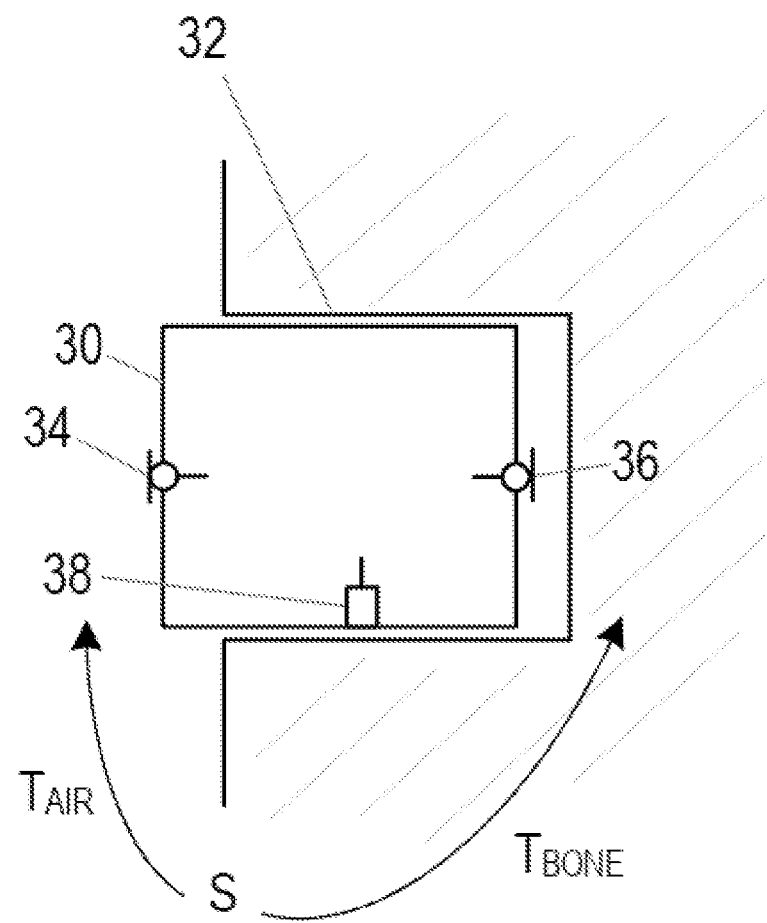
FIG. 3 illustrates in more detail a part of the device of FIG. 1.

FIG. 3 illustrates in more detail a part of the device of FIG. 1.

Specifically, FIG. 3 illustrates an example where the accessory device is an earphone, which is being worn. More specifically, FIG. 3 shows an earbud 30 at the entrance to a wearer's ear canal 32.

In general terms, the earphone comprises a first transducer and a second transducer. While a person is wearing the earphone, a first transducer is located on an outward facing part of the earphone and a second transducer is located on a part of the earphone facing into the person's ear canal.

In the embodiment shown in FIG. 3, the first transducer comprises a microphone 34, located such that it can detect ambient sound in the vicinity of the earbud 30.

In the embodiment shown in FIG. 3, the earbud 30 also comprises a second microphone 36, located such that it can detect sound in the wearer's ear canal 32. The earbud 30 also comprises an accelerometer 38, located on the earbud 30 such that it can detect vibrations in the surface of the wearer's ear canal 32 resulting from the transmission of sound through the wearer's head. The second transducer, mentioned above, can be the second microphone 36, or can be the accelerometer 38.

As mentioned above, the accessory device may be any suitable wearable device, for example smart glasses, which are provided with a microphone for detecting sound that has travelled through the air, and are also provided with a second transducer such as an accelerometer that is mounted in a position that is in contact with the wearer's head when the glasses are being worn, such that the accelerometer can detect vibrations in resulting from the transmission of sound through the wearer's head.

In particular, embodiments described herein obtain information about the sound conduction path, through the wearer's head, by comparing the signals detected by the first transducer and the second transducer. More specifically, embodiments described herein obtain information about the sound conduction path, through the wearer's head, by comparing the signals detected by the first transducer and the second transducer at times when the wearer is speaking.

Thus, as shown in FIG. 3, when the wearer is speaking and generating a sound S, this is modified by a first transfer function $T_{AIR}$ through the air before it is detected by the external microphone 34, and it is modified by a second transfer function $T_{BONE}$ through the bone and soft tissue of the wearer's head before it is detected by the internal transducer 36 or 38.

The processing of the signals generated by the external microphone 34, and by the one or more internal transducer 36, 38, may be performed in circuitry provided within the earbud 30 itself. However, in embodiments described herein, the signals generated by the external microphone 34 and by the one or more internal transducer 36, 38 may be transmitted by a suitable wired or wireless connection to the host device 20, where the processing of the signals, as described in more detail below, takes place.

Figures 4, 5:
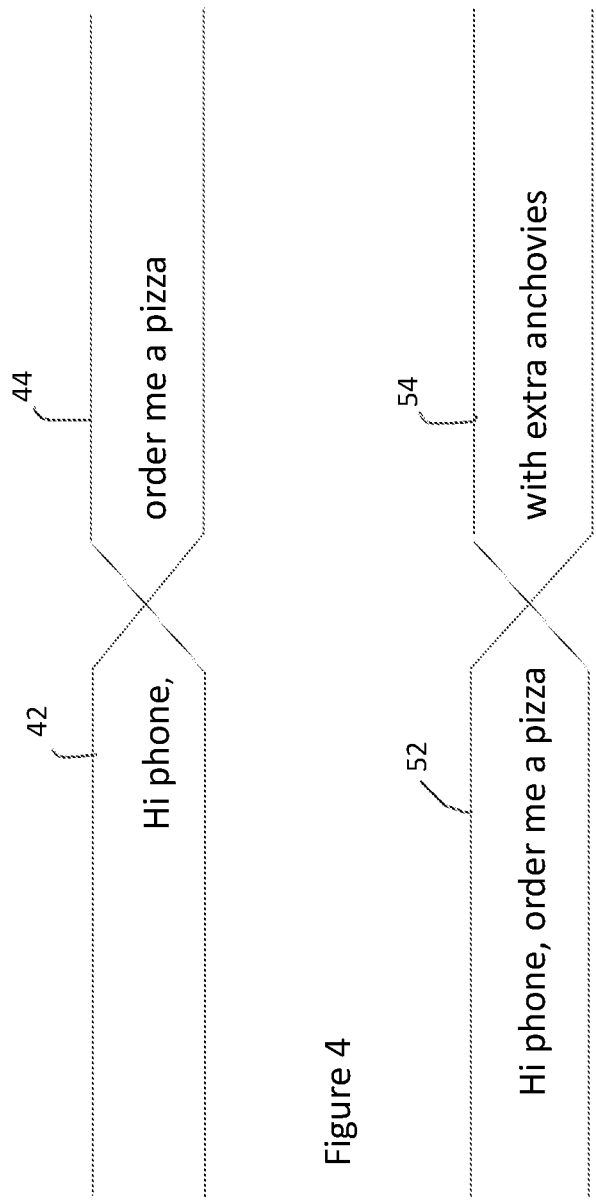
FIG. 4 illustrates an example of an attack on a voice-activated device.
FIG. 5 illustrates another example of an attack on a voice-activated device.

FIG. 4 illustrates an example of an attack on a voice-activated device.

FIG. 4 illustrates the operation of a voice-activated device, which, in order to reduce its power consumption, is normally in a low-power sleep mode, and requires an enrolled user to speak a predetermined trigger phrase, in order to wake the system from the low-power mode, in order that speech recognition can be performed.

Thus, as shown at 42, the user speaks the predetermined trigger phrase, which in this case is "Hi phone", that is used to activate the speech recognition functionality.

However, before the user can speak a command, another person speaks, as shown at 44, and says something that might be interpreted as a command, namely, in this illustrative example "Order me a pizza".

If the speaker recognition system is unable to recognise that the person speaking the words "Order me a pizza" is not the enrolled user, then the system might act on that command, which might be against the wishes of the enrolled user.

This is referred to as a competitive command.

FIG. 5 illustrates another example of an attack on a voice-activated device.

FIG. 5 again illustrates the operation of a voice-activated device, which, requires the enrolled user to speak the predetermined trigger phrase, in order to wake the system from the low-power mode.

Thus, as shown at 52, the user speaks the predetermined trigger phrase, which in this case is "Hi phone", that is used to activate the speech recognition functionality.

In addition, the user speaks a command, namely, in this illustrative example "order me a pizza". If the speaker recognition system is able to recognise that the person speaking the words "order me a pizza" is the enrolled user, then the system will act on that command, and fulfil the wishes of the enrolled user.

However, as shown at 54, another person then speaks, and says something that might be interpreted as a part of the same command, namely, in this illustrative example "with extra anchovies".

If the speaker recognition system is unable to recognise that the person speaking the words "with extra anchovies" is not the enrolled user, i.e. is not the person who spoke the words "Order me a pizza", then the system might act on the entire command, "Order me a pizza with extra anchovies", which might be against the wishes of the enrolled user.

This is referred to as a tailgating attack on the system.

As illustrated with reference to FIGS. 4 and 5, therefore, it is advantageous if the speaker recognition system is able to recognise when a first part of a received signal has been spoken by an enrolled user, but a subsequent part of the received signal has been spoken by a different person.

It is possible to perform speaker recognition on the speech signal that corresponds to the predetermined trigger phrase in a relatively reliable way, because the user will typically have been required to utter the predetermined trigger phrase during the enrolment process. This is referred to as a text-dependent speaker recognition process. Therefore, when the user speaks the predetermined trigger phrase to wake the system, it can be expected that the speech will closely resemble the speech during the enrolment.

However, the text-independent speaker recognition process that is required to confirm that a command has been spoken by the enrolled user is more difficult, at least in the sense of being more computationally intensive, and typically is less reliable.

Thus, the method disclosed herein proceeds from the recognition that, when the speaker is wearing a wearable accessory, there exists a mechanism for determining whether the speech following the trigger phrase was spoken by the same person as the trigger phrase. If the voice biometric process can be used to determine that the trigger phrase was spoken by the enrolled user, then this additional information can be used for confirming whether the speech following the trigger phrase was spoken by the enrolled user.

Figure 6:
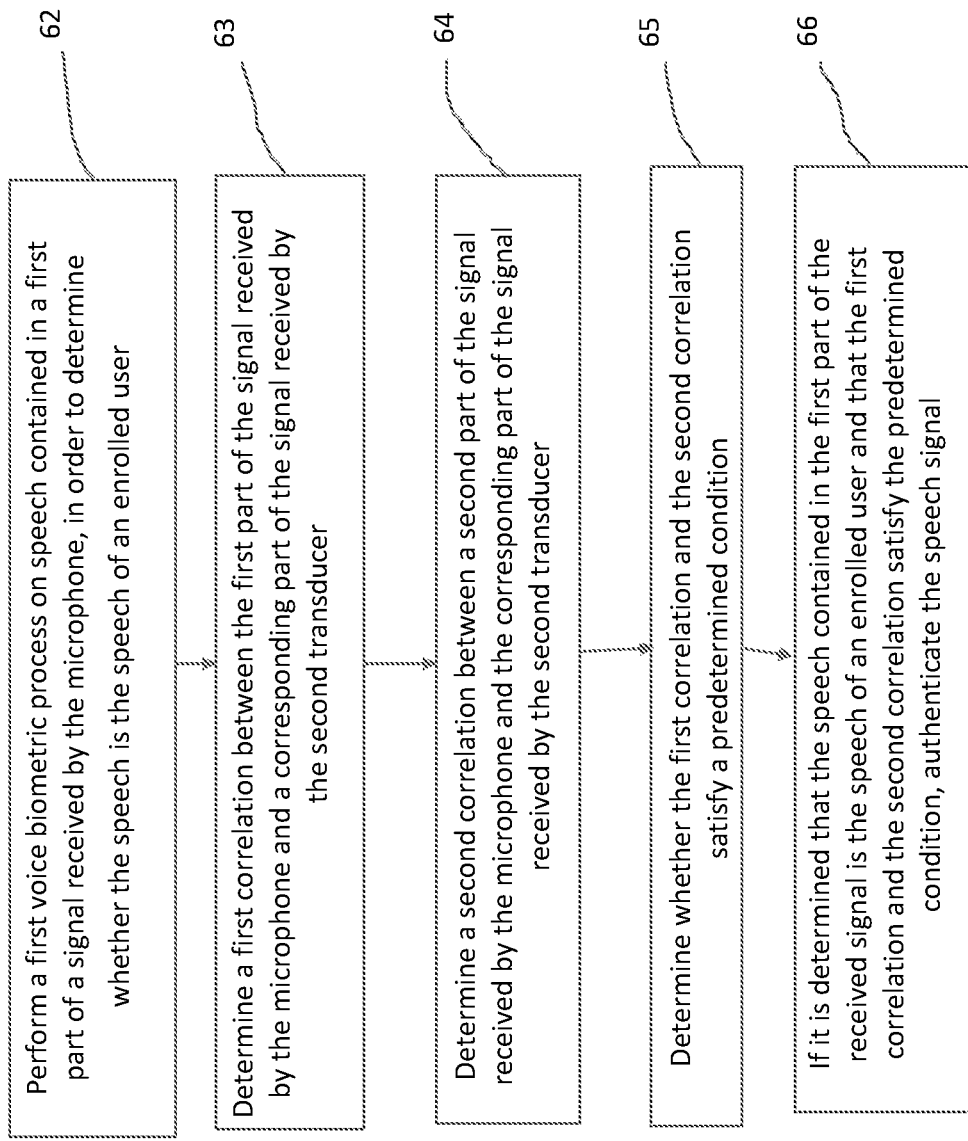
FIG. 6 is a flow chart illustrating a method in accordance with the present disclosure.

FIG. 6 is a flow chart illustrating a method in accordance with the present disclosure.

Specifically, FIG. 6 shows a method of authenticating a speech signal received by a device comprising first and second transducers, where the first transducer comprises a microphone.

In step 62, a first voice biometric process is performed on speech contained in a first part of a signal received by the microphone, in order to determine whether the speech is the speech of an enrolled user. For example, the first voice biometric process may be a text-dependent voice biometric process.

In step 63, a first correlation is determined between the first part of the signal received by the microphone and a corresponding part of the signal received by the second transducer.

In step 64, a second correlation is determined between a second part of the signal received by the microphone and the corresponding part of the signal received by the second transducer.

In step 65, it is determined whether the first correlation and the second correlation satisfy a predetermined condition.

In step 66, if it is determined that the speech contained in the first part of the received signal is the speech of an enrolled user and that the first correlation and the second correlation satisfy the predetermined condition, the received speech signal is authenticated.

As mentioned above, in one example, the first voice biometric process may be a text-dependent voice biometric process. However, in another example, the first biometric process may be a text-independent voice biometric process. A good text-independent biometric process typically has a high power consumption, so one possibility enabled by this method is to run the first biometric process for a first part of the received signal that lasts a relatively short period of time (for example of the order of 1 second), and then disable the first biometric process, relying on the correlations described above to confirm that the same person was speaking and to authenticate the entire received speech signal.

Figure 7:
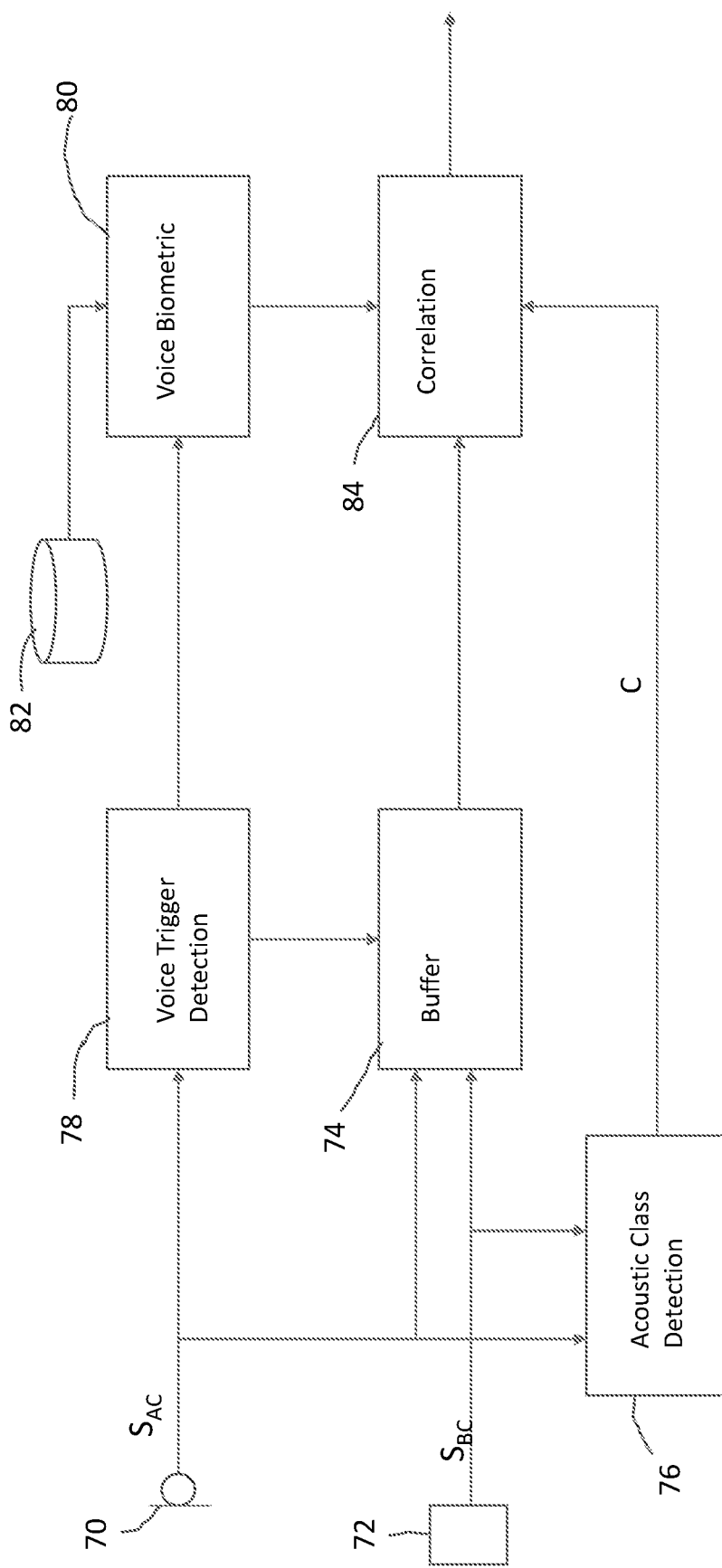
FIG. 7 is a block diagram illustrating a system for performing the method of FIG. 6.

FIG. 7 is a block diagram illustrating a system for performing the method of FIG. 6.

As described with reference to FIG. 3, a first input signal $S_{AC}$ is received from a first transducer, in the form of a microphone 70, which is located such that it can detect ambient sound in the vicinity of the wearable accessory device.

A second input signal $S_{BC}$ is received from a second transducer 72, which is located such that it can detect vibrations caused by the transmission of sound through the wearer's body. As previously described, when the wearable accessory is a headphone, the second transducer may take the form of a microphone located such that it can detect sound in the wearer's ear canal 32, or may take the form of an accelerometer, located in the user's ear canal or elsewhere such that it can detect vibrations in the surface of the wearer's ear canal resulting from the transmission of sound through the wearer's head. When the wearable accessory comprises smart glasses, the second transducer may take the form of an accelerometer, held in position against the user's head such that it can detect vibrations resulting from the transmission of sound through the wearer's head.

The signal $S_{AC}$ received from the first transducer 70, and the signal $S_{BC}$ received from the second transducer 72 are passed to a buffer 74, where they can be stored for a short period of time for further processing as required.

In general terms, the bones and soft tissue of a person's head are able to transmit the sounds of voiced speech to a reasonable extent, but are not able to transmit the sounds of unvoiced speech to any significant extent. Thus, when a person wearing a wearable accessory as described herein is speaking, there is usually a good correlation between the signal $S_{AC}$ received from the first transducer 70, and the signal $S_{BC}$ received from the second transducer 72 during periods of voiced speech, but not during periods of unvoiced speech.

The received signals $S_{AC}$ and $S_{BC}$ are therefore passed to an acoustic class detection block 76, which detects the acoustic class of received speech, and in particular distinguishes between voiced and unvoiced speech. As is known, the presence of voiced speech may be detected by examining a pitch period (F0), for example by consideration of the cepstrum or the Harmonic Product Spectrum (HPS). In most situations, the acoustic class of the received speech can be determined satisfactorily from the signal $S_{AC}$ that is received from the first transducer 70, and therefore it is not essential that the signal $S_{BC}$ received from the second transducer 72 should be passed to the acoustic class detection block 76. However, particularly when the signal-to-noise ratio is low, it is useful for the acoustic class detection block 76 to be able to use the signal $S_{BC}$ received from the second transducer 72 in addition to, or as an alternative to, the signal $S_{AC}$ that is received from the first transducer 70.

The signal $S_{AC}$ received from the microphone 70 is also passed to a voice trigger detection block 78, which identifies when the speech in the received signal represents the predetermined trigger phrase.

The part of the signal $S_{AC}$ received from the microphone 70 that represents the predetermined trigger phrase is also passed to a voice biometric block 80, which performs a biometric process on the received signal. For example, the voice biometric block 80 may extract features from the received signal, and compare the extracted features with a model of the speech of the enrolled use that was generated during an enrolment process and stored in a database 82. For example, because the voice biometric block 80 is intended to perform a speaker recognition process on the predetermined trigger phrase, it can take the form of a text-dependent speaker recognition process. However, in other embodiments the voice biometric block 80 may perform a text-independent speaker recognition process on the predetermined trigger phrase, or on any part of the received signal, as desired.

When the voice trigger detection block 78 determines that the speech in the received signal represents the predetermined trigger phrase, a control signal is sent to the buffer 74, and the stored signals $S_{AC}$ and $S_{BC}$ are sent to a correlation block 84. Specifically, signals starting from a point in time before the voice trigger detection block 78 determines that the predetermined trigger phrase has been spoken are sent to the correlation block 84. The point in time is selected to be early enough that the signals that are sent to the correlation block 84 include the signals that correspond to the predetermined trigger phrase itself. For example, the signals that are sent to the correlation block 84 may start from a point in time that is 1 second before the point at which the voice trigger detection block 78 determines that the predetermined trigger phrase has been spoken.

The operation of the correlation block 84 will be described in more detail below.

The output of the voice biometric block 80 and the output of the correlation block 84 are then combined to provide the final authentication output. The voice biometric block 80 provides an output that indicates whether the predetermined trigger phrase was spoken by the enrolled user. The correlation block 84 provides an output that indicates whether the person speaking during a first part of the received signal is the same person that continues speaking for the entire duration of the received signal.

If both of these conditions are met, it can be assumed that the enrolled user was speaking for the entire duration of the received signal, and the correlation block can provide a suitable output.

FIG. 7 shows the output of the voice biometric block 80 being provided to the correlation block 84, and the correlation block 84 providing a combined output. In other embodiments, the voice biometric block 80 and the correlation block 84 may provide separate outputs, which may then be combined.

As discussed above, the signals $S_{AC}$ and $S_{BC}$ that are provided to the correlation block 84 are expected to be relatively well correlated, provided that it is the person wearing the accessory that is speaking, and provided that the speech is voiced speech.

The output of the acoustic class detection block 76 is therefore used as a control input to the correlation block 84. The correlation block 84 examines the correlation between the signals $S_{AC}$ and $S_{BC}$ during periods when they represent voiced speech.

In this example embodiment, the correlation block 84 examines the correlation between the signals $S_{AC}$ and $S_{BC}$ by forming a prediction or estimate of $S_{BC}$, referred to here as $S_{BC}{}^*$, from $S_{AC}$, and then determining whether the actual signal $S_{BC}$ matches the estimate $S_{BC}{}^*$.

The basis for forming this estimate is shown in FIG. 3, where it can be seen that the signal $S_{AC}$ results from the application of the first transfer function $T_{AIR}$ to the originally generated sound S, while the signal $S_{BC}$ results from the application of the second transfer function $T_{BONE}$ to the sound S.

Thus, $S_{AC} = S \cdot T_{AIR}$ and $S_{BC} = S \cdot T_{BONE}$, and so:

$$S = S_{AC}/T_{AIR} = S_{BC}/T_{BONE}$$

Therefore:

$$S_{BC} = T \cdot S_{AC}, \text{ where:}$$

$$T = T_{BONE}/T_{AIR}.$$

Since $T_{AIR}$ can effectively be ignored, it is reasonable to assume that:

$$S_{BC} = T_{BONE} \cdot S_{AC}.$$

Figure 8:
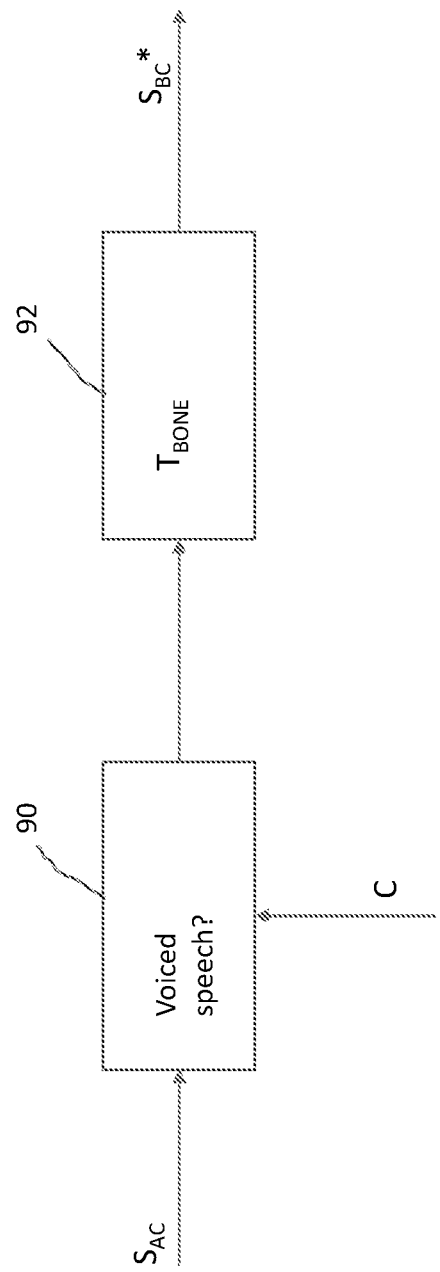
FIG. 8 is a timing diagram illustrating operation of the system of FIG. 7.

FIG. 8 is a block diagram, illustrating the process for forming the estimate $S_{BC}{}^*$ from $S_{AC}$.

As shown in FIG. 8, the received signal $S_{AC}$ is passed to a first block 90, which determines whether, at that specific time, the signal $S_{AC}$ represents voiced speech. This determination is made on the basis of the control signal C received from the acoustic class detection block 76.

During periods when the signal $S_{AC}$ represents voiced speech, it is passed to a filter 92, which multiplies the signal $S_{AC}$ by an estimate of the transfer function $T_{BONE}$ (described with reference to FIG. 3), in order to arrive at the estimate $S_{BC}{}^*$.

In FIG. 8, the filter 92 may be a fixed filter, or may be an adaptive filter.

For example, $T_{BONE}$ may be acceptably approximated by a fixed low-order lowpass filter with an 800 Hz cut-off frequency. However, in that case, there will be an unknown gain shift between the signals $S_{AC}$ and $S_{BC}$. An adaptive filter can be used to determine the gain G that is needed to compensate for this.

Figure 9:
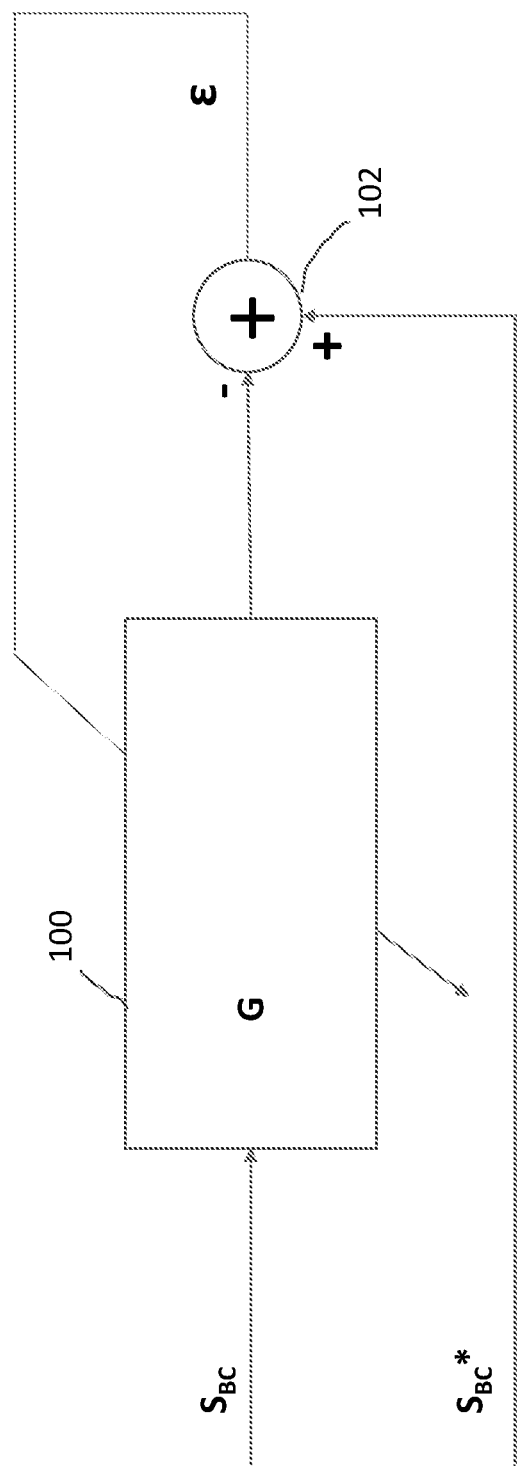
FIG. 9 illustrates operation of a part of the system of FIG. 7.

FIG. 9 illustrates the operation of this part of the system.

The signal $S_{BC}$ is applied to an adaptive gain block 100, which multiplies the signal by a gain value G. The multiplied signal is applied to one input of a subtractor 102.

The estimate $S_{BC}{}^*$ of $S_{BC}$ is applied to a second input of the subtractor 102.

Thus, the output of the subtractor 102 is an error signal ε, which is used to control the gain value G applied by the adaptive gain block 100, in such a way that the value of ε is minimised.

The resulting final gain value G can be applied to the signal $S_{BC}$ at any convenient point in the system.

As mentioned above, the filter 92 shown in FIG. 8 may alternatively be an adaptive filter.

Figure 10:
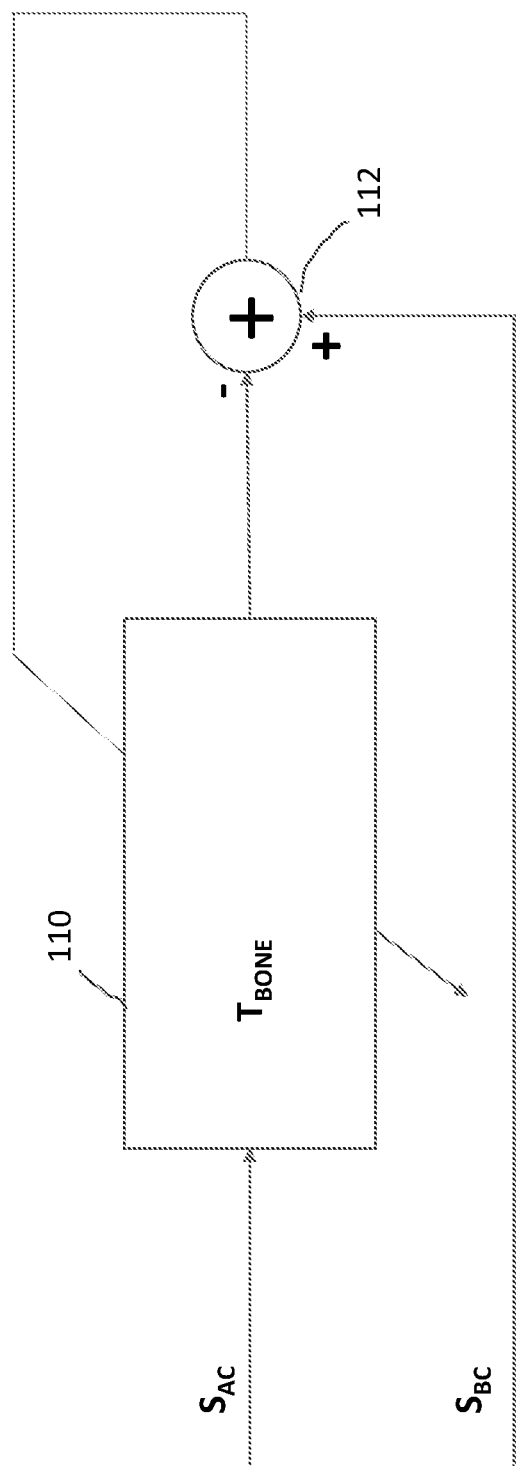
FIG. 10 illustrates operation of a part of the system of FIG. 7.

FIG. 10 illustrates the mechanism for determining the required form of the filter 92 in this case.

The signal $S_{AC}$ is applied to an adaptive filter 110, which multiplies the signal by a filter function $T_{BONE}$. The multiplied signal is applied to one input of a subtractor 112.

The second signal $S_{BC}$ is applied to a second input of the subtractor 112.

Thus, the output of the subtractor 112 is an error signal ε, which is used to control the filter function $T_{BONE}$ applied by the adaptive filter 110, in such a way that the value of ε is minimised. The system therefore performs a Least Mean Squares (LMS) method of adaptation.

The adaptation of the filter function should take place slowly enough that the effect of noise on the signal $S_{AC}$ is averaged out, and hence the filter function of the block 110 becomes equal to the transfer function that needs to be applied to the signal $S_{AC}$, to make it equal to the signal $S_{BC}$, i.e. the transfer function $T_{BONE}$ in the equation above.

Thus, the resulting filter function $T_{BONE}$ when the system has settled is the form of the filter that can be used as the adaptive filter 92 in FIG. 8.

Figure 11:
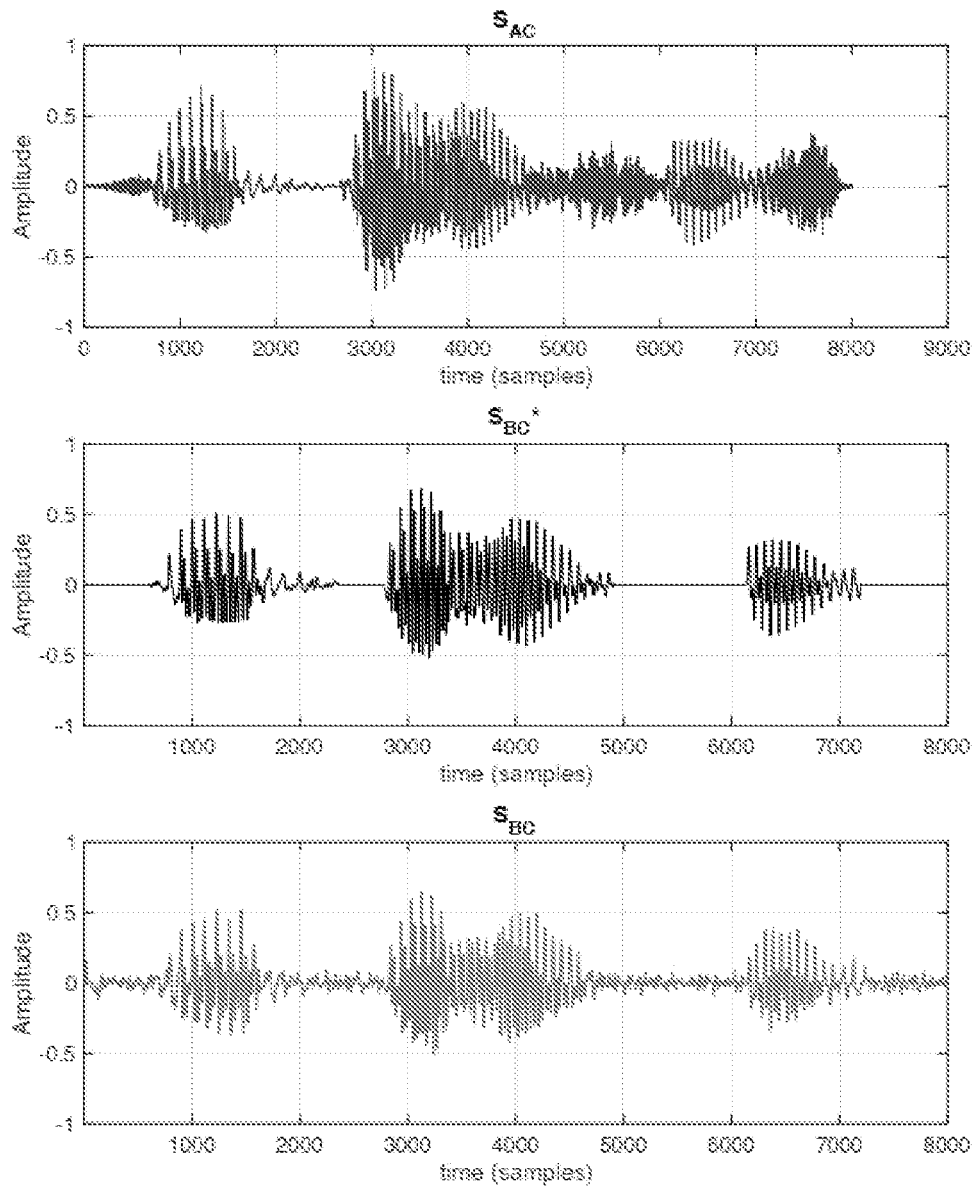
FIG. 11 illustrates operation of a part of the system of FIG. 7.

FIG. 11 illustrates signals generated in the system of FIG. 7, in one example.

Specifically, FIG. 11 shows the signal $S_{AC}$, the signal $S_{BC}{}^*$ that is derived from $S_{AC}$ as an estimate of $S_{BC}$, and the signal $S_{BC}$, in one example, as functions of time.

The next step in determining the correlation between the signals is to extract the energy of the signals.

Figure 12:
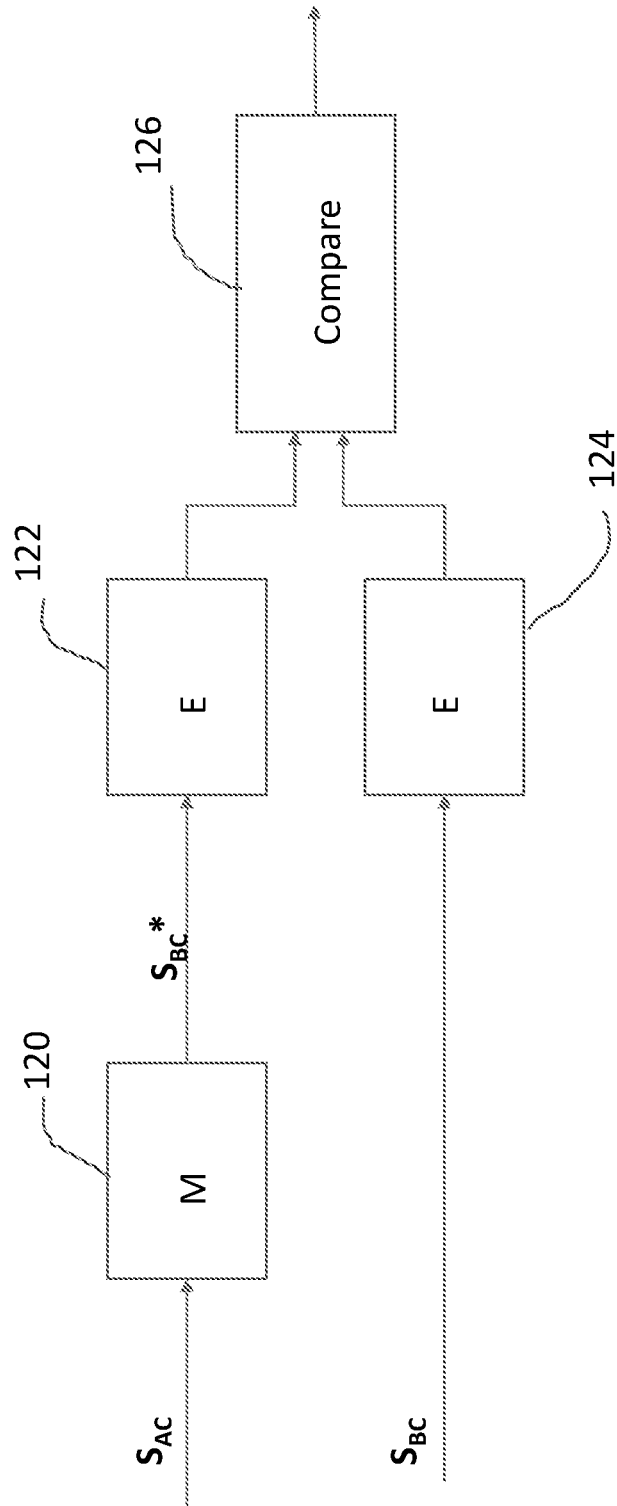
FIG. 12 illustrates signals generated in the system of FIG. 7, in one example.

FIG. 12 illustrates this next step.

Specifically, FIG. 12 shows the signal $S_{AC}$ being applied to a block 120, which determines an estimate $S_{BC}{}^*$ of the signal $S_{BC}$, as described with reference to FIG. 8.

The estimate $S_{BC}{}^*$ is then applied to a first energy calculation block 122, which calculates the energy $E_{BC}{}^*$ of the estimate $S_{BC}{}^*$.

At the same time, the signal $S_{BC}$ is applied to a second energy calculation block 124, which calculates the energy $E_{BC}$ of the signal $S_{BC}$.

The energy calculation blocks 122, 124 can for example operate by squaring the signals and then low-pass filtering them, or by applying a Teager Kaiser Operator, but other possibilities exist.

The outputs of the two energy calculation blocks 122, 124 are passed to a comparison block 126, which compares them, and determines if they are sufficiently similar to meet a similarity threshold. For example, the comparison block 126 may determine the Pearson Correlation Coefficient, the Cosine similarity, the Euclidian distance, or any other statistical distance metric, e.g. Bhattacharya or Mahalanobis, or any other similarity metric, between the outputs of the two energy calculation blocks 122, 124.

Figure 13A:
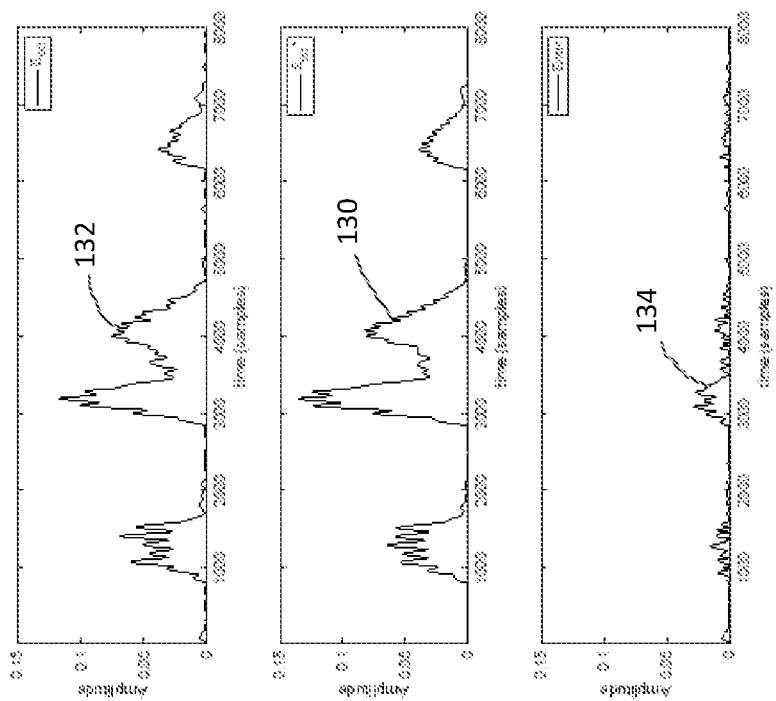
FIGS. 13(a), 13(b), and 13(c), collectively referred to as FIG. 13, illustrate operation of a part of the system of FIG. 7.
Figure 13B:
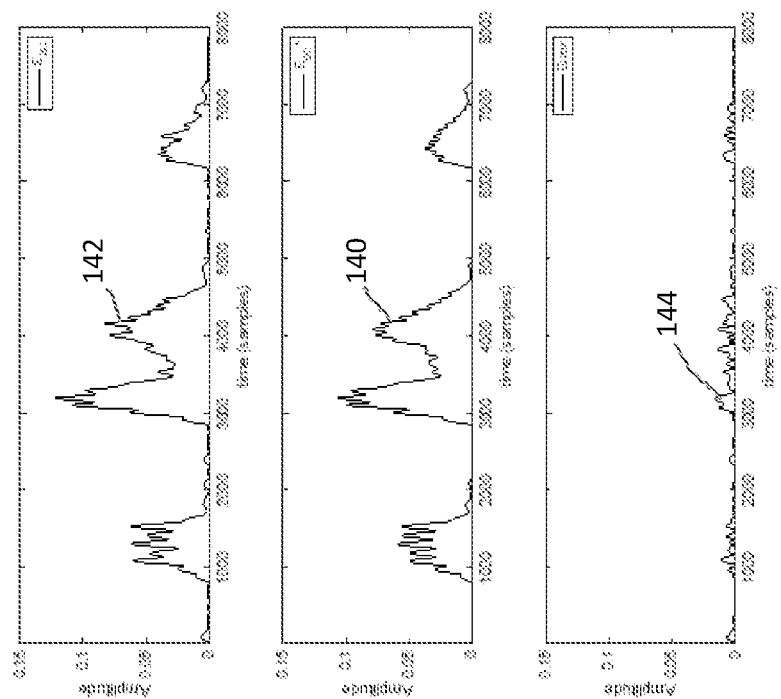

FIG. 13 illustrates the operation of this part of the system of FIG. 7.

Specifically, FIG. 13(*a*) shows with line 130 the output $E_{BC}{}^*$ of the first energy calculation block 122, and shows with line 132 the output $E_{BC}$ of the second energy calculation block 124, in the case where the person speaking is the person who is wearing the wearable accessory, and where a fixed filter is used as the filter 92 in FIG. 8.

FIG. 13(*a*) also shows the amplitude 134 of the difference between the outputs 130 and 132.

FIG. 13(*b*) shows with line 140 the output $E_{BC}{}^*$ of the first energy calculation block 122, and shows with line 142 the output $E_{BC}$ of the second energy calculation block 124, in the case where the person speaking is the person who is wearing the wearable accessory, and where an adaptive filter is used as the filter 92 in FIG. 8.

FIG. 13(*b*) also shows the amplitude 144 of the difference between the outputs 140 and 142.

In both FIG. 13(*a*) and FIG. 13(*b*), it can be seen that the outputs of the two energy calculation blocks are very similar, and hence that the amplitudes 134, 144 of the difference signals are very small.

This implies that the signal $S_{AC}$ can be used to form a good estimate $S_{BC}{}^*$ of the signal $S_{BC}$, and hence can be used as a reliable indicator that the person speaking is the person who is wearing the wearable accessory.

Figure 13C:
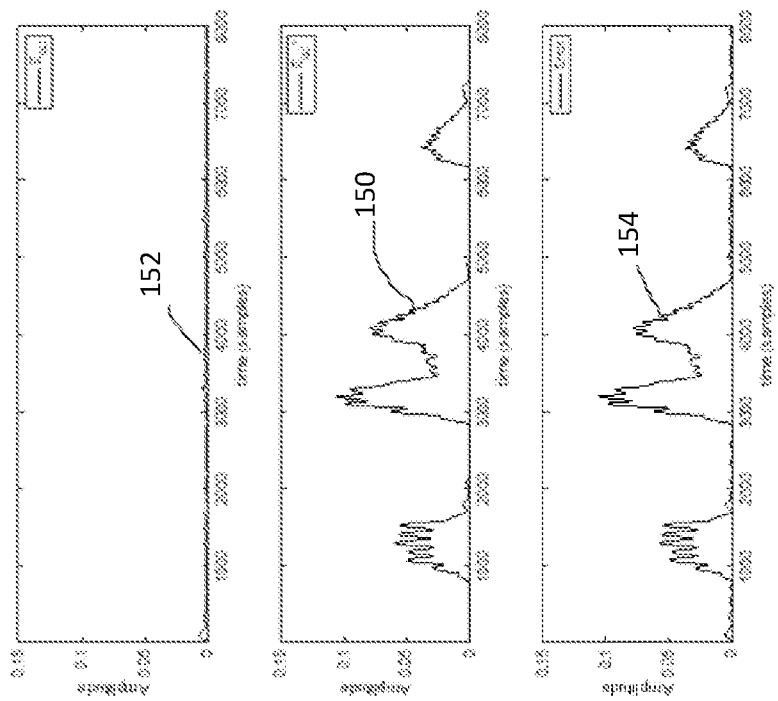

FIG. 13(c) shows with line 150 the output $E_{BC}^*$ of the first energy calculation block 122, and shows with line 152 the output $E_{BC}$ of the second energy calculation block 124, in the case where the person speaking is not the person who is wearing the wearable accessory.

FIG. 13(c) also shows the amplitude 154 of the difference between the outputs 150 and 152.

In FIG. 13(c), it can be seen that the outputs of the two energy calculation blocks are very different, and hence that the amplitude 154 of the difference signal is quite large.

This implies that the signal $S_{AC}$ cannot be used to form a good estimate $S_{BC}^*$ of the signal $S_{BC}$, and hence this can be used as a reliable indicator that the person speaking is not the person who is wearing the wearable accessory.

In fact, in this illustrated case, the energy $E_{BC}$ of the signal detected by the second transducer, i.e. the transducer located in the wearer's ear canal, is very small, which is itself a good indication that the person wearing the wearable accessory is not speaking.

Thus, as described with reference to FIG. 6, the correlation process described above is used for determining a first correlation between a first part of the signal $S_{AC}$ received by the microphone and a corresponding part of the signal $S_{BC}$ received by the second transducer, where the first part of the signal may correspond to the predetermined trigger phrase. The degree of correlation between them may be represented by a first correlation value. The correlation process is also used for determining a second correlation between a second part of the signal $S_{AC}$ received by the microphone and the corresponding part of the signal $S_{BC}$ received by the second transducer, where the second part of the signal may correspond to the period following the trigger phrase. The degree of correlation between them may be represented by a second correlation value.

It is then determined whether the first correlation and the second correlation satisfy a predetermined condition. The predetermined condition may for example relate to a specific relationship between the first correlation value and the second correlation value. For example, the predetermined condition may be that the first and second correlation values are sufficiently similar that it can be assumed that the person speaking was the same during the first and second parts of the signal.

In other embodiments, the predetermined condition may be that the first and second correlation values are above a respective threshold. The two thresholds used in this determination may be the same or may be different. When the first part of the signal represents a trigger phrase, i.e. the speech content of the first part of the signal is known, the degree of correlation may be high, because it may be possible to set a useful threshold value with a high degree of confidence, whereas it is more difficult to set the threshold value for the second part of the signal, because the speech content is unknown and also of unknown length, and the degree of correlation may be lower.

The thresholds may be calculated using Decision Cost Function (DCF) methodology or Neyman-Pearson methodology. As mentioned above, the thresholds may be different, but as an example both may be set such that a correlation factor should exceed 0.8.

In the embodiment disclosed above, the first and second correlation values are obtained by examining the energies of the respective signals, during the relevant time periods. In an alternative embodiment, the first and second correlation values are obtained by calculating the Pearson correlation coefficient between the relevant part of the signal $S_{AC}$ and the corresponding part of the signal $S_{BC}$.

Figure 14:
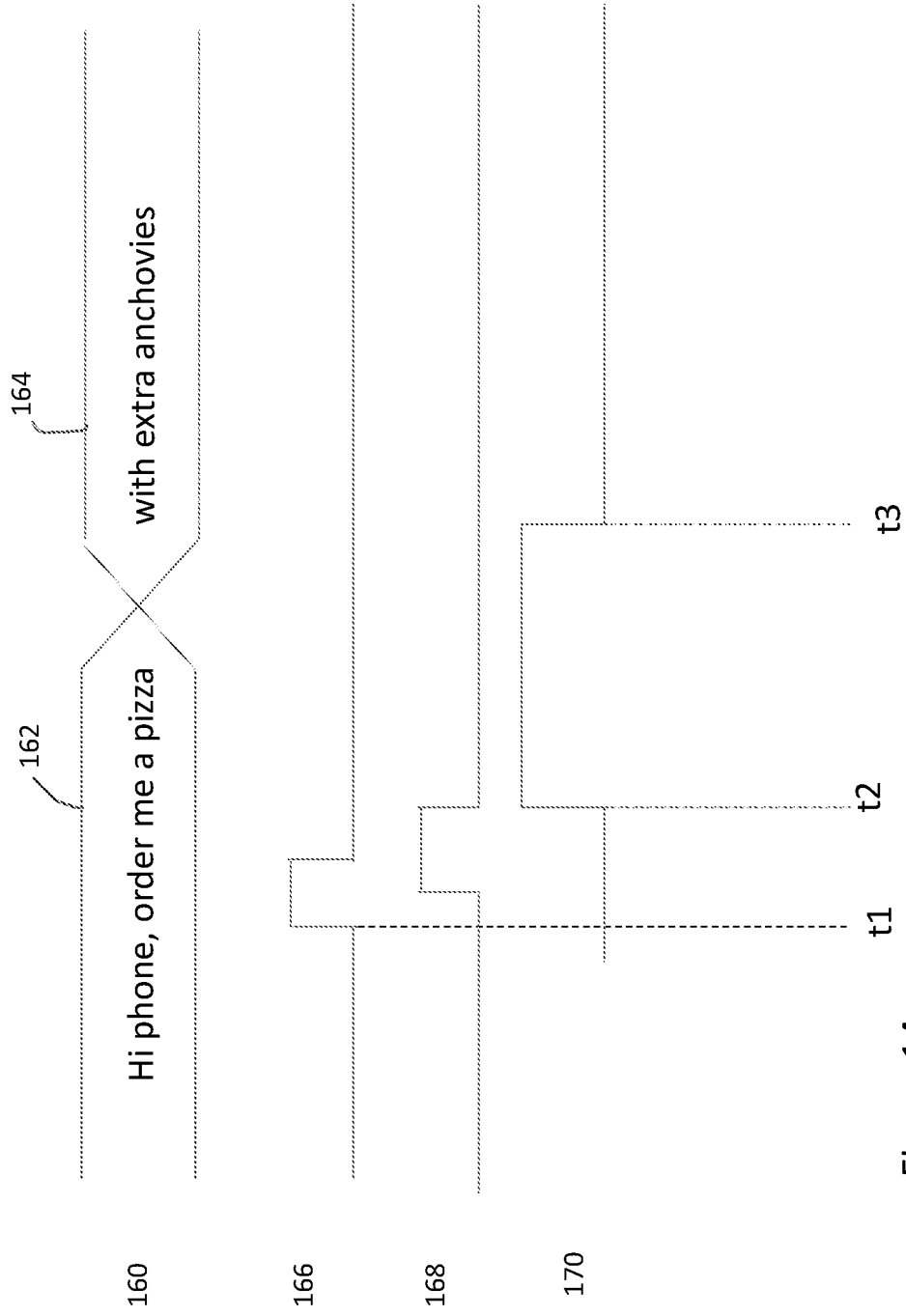
FIG. 14 illustrates operation of a part of the system of FIG. 7.

FIG. 14 illustrates the operation of the system of FIG. 7.

Specifically, FIG. 14 is a timing diagram illustrating the operation of the system of FIG. 7.

The top line 160 of FIG. 14 shows the words being spoken and being detected by the microphone. Specifically, as shown at 162, FIG. 14 shows the words "Hi phone, order me a pizza" being spoken by a first person, who is the wearer of the wearable accessory. In addition, at 164, another person then speaks, and says "with extra anchovies".

The line 166 illustrates the output of the voice trigger detection block 78 in FIG. 7. Thus, the voice trigger detection block 78 generates an output at time t1, shortly after the predetermined trigger phrase has been spoken.

In fact, the subsequent processing of the received signals only begins when it has been determined that the predetermined trigger phrase has been spoken, and the stored signals are retrieved from the buffer 74. However, for ease of reference, the following steps will be described as if they are performed directly on the received signals, rather than after a short time delay.

The line 168 illustrates the output of the voice biometric block 80 in FIG. 7. Thus, the voice biometric block 80 also generates an output shortly after the predetermined trigger phrase has been spoken. In this illustrated example, it is assumed that this is a positive output, indicating that the speaker was the enrolled user.

Also, when the predetermined trigger phrase has been spoken, and the stored signals are retrieved from the buffer, the correlation block 84 is activated. The line 170 illustrates the output of the correlation block 84. As described above, the correlation block 84 produces an output that is the result of comparing two correlation values, one obtained from the predetermined trigger phrase, and one obtained from the subsequent speech.

Thus, at time t2, shortly after the predetermined trigger phrase has been completed, and the words "order me a pizza" have started to be spoken, the correlation block 84 is able to produce an output. In this case, it produces a positive output, indicating that the speaker was the same person as spoke the predetermined trigger phrase.

However, at time t3, shortly after the original speaker has finished speaking, and the other person has started to speak the words "with extra anchovies", the correlation block 84 recognises that the person speaking now is not the same person that was speaking before.

Figure 15:
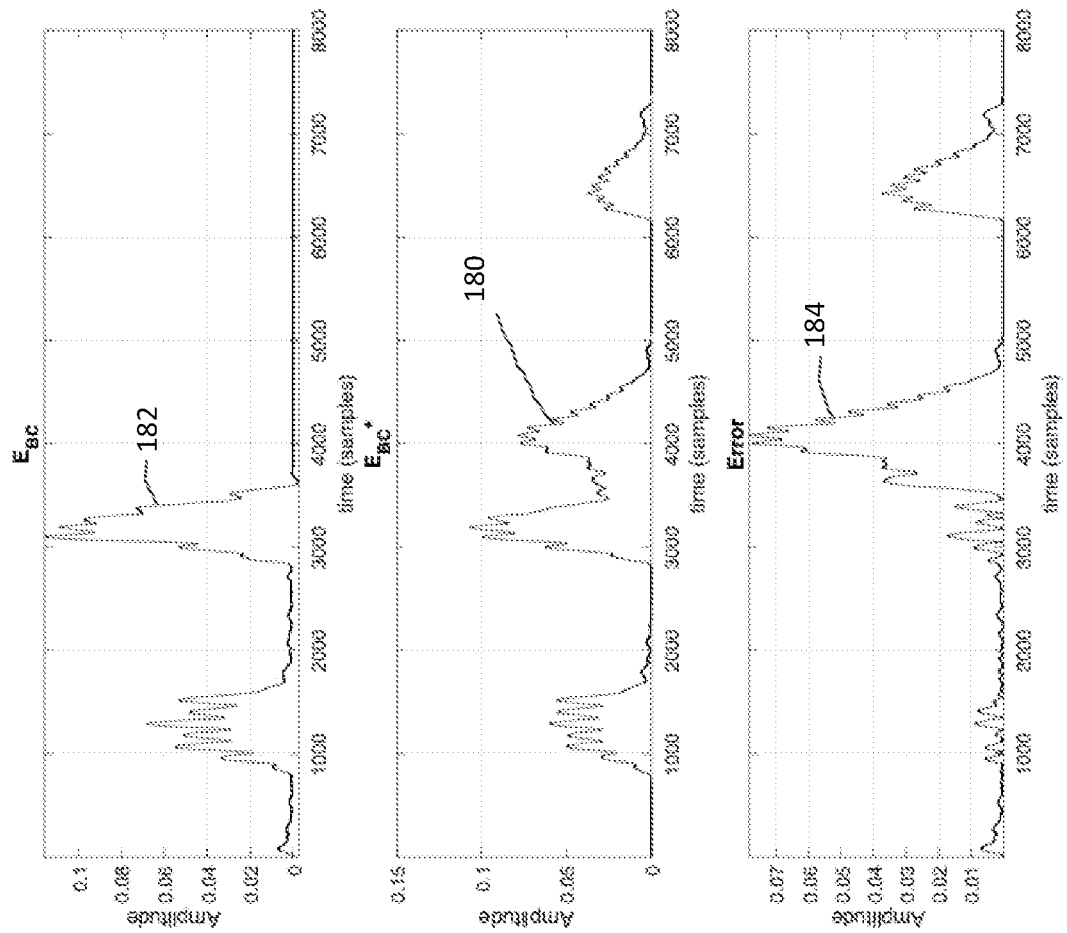
FIG. 15 illustrates operation of a part of the system of FIG. 7.

FIG. 15 illustrates the operation of the correlation block 84 during this process.

Specifically, FIG. 15 shows with line 180 the output $E_{BC}^*$ of the first energy calculation block 122, and shows with line 182 the output $E_{BC}$ of the second energy calculation block 124.

FIG. 15 also shows the amplitude 184 of the difference between the outputs 180 and 182.

Thus, it can be seen that, up until a time of about 3000 samples in FIG. 15, the output $E_{BC}^*$ of the first energy calculation block 122 is a good estimate of the output $E_{BC}$ of the second energy calculation block 124, and the error signal 184 has a very small amplitude.

However, for subsequent times, the output $E_{BC}$ of the second energy calculation block 124 itself has a very small amplitude, and hence the output $E_{BC}^*$ of the first energy calculation block 122 is not a good estimate of the output $E_{BC}$ of the second energy calculation block 124, and the error signal 184 has a large amplitude.

Thus, the correlation block 84 is able to produce an output that confirms that the initial speaker was the enrolled user, but that the words "with extra anchovies" were not spoken by the enrolled user.

This means that, in effect, speaker recognition can be performed, but this is achieved in a reliable way without requiring intensive processing.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A method of authenticating a speech signal received by a device comprising first and second transducers, wherein the first transducer comprises a microphone, the method comprising:
    performing a first voice biometric process on speech contained in a first part of a signal received by the microphone, in order to determine whether the speech is the speech of an enrolled user;

determining a first correlation between said first part of the signal received by the microphone and a corresponding part of the signal received by the second transducer;

determining a second correlation between a second part of the signal received by the microphone and the corresponding part of the signal received by the second transducer, said second part different from said first part; and determining whether the first correlation and the second correlation satisfy a predetermined condition;

if it is determined that the speech contained in the first part of the received signal is the speech of an enrolled user and that the first correlation and the second correlation satisfy the predetermined condition, authenticating the received speech signal; and if it is determined that the speech contained in the first part of the received signal is not the speech of an enrolled user, not authenticating the received speech signal.

2. The method of claim 1, wherein the second transducer is mechanically coupled to a person wearing the device.

3. The method of claim 2, wherein the second transducer comprises a microphone, positioned to detect sound in an ear canal of the person wearing the device.

4. The method of claim 2, wherein the second transducer comprises an accelerometer, positioned to detect vibrations caused by speech of the person wearing the device.

5. The method of claim 1, wherein the device comprises a headset.

6. The method of claim 1, wherein the device comprises a pair of smart glasses.

7. The method of claim 1, wherein the steps of determining the first correlation and the second correlation comprise:

identifying segments of the respective part of the signal received by the microphone and the corresponding part of the signal received by the second transducer in at least one acoustic class;

applying a filter to at least one of said segments; and determining a degree of correlation between, the segments of the respective part of the signal received by the microphone and the corresponding part of the signal received by the second transducer, after applying said filter.

8. The method of claim 7, wherein the step of determining a degree of correlation between the segments of the respective part of the signal received by the microphone and the corresponding part of the signal received by the second transducer comprises:

calculating energies in a plurality of frames of said segments; and determining whether a difference between the calculated energies is below a threshold level.

9. The method of claim 7, wherein the step of determining a degree of correlation between the segments of the respective part of the signal received by the microphone and the corresponding part of the signal received by the second transducer comprises calculating a correlation coefficient between them.

10. The method of claim 7, wherein the at least one acoustic class comprises voiced speech.

11. The method of claim 7, wherein the filter comprises a fixed filter.

12. The method of claim 11, wherein the filter further comprises an adaptive gain.

13. The method of claim 7, wherein the filter is an adaptive filter, and wherein a filter characteristic of the adaptive filter is determined.

14. The method of claim 1, wherein the first biometric process is a text-dependent biometric process.

15. The method of claim 1, wherein determining whether the first correlation and the second correlation satisfy a predetermined condition comprises determining whether the first correlation and the second correlation have a predetermined relationship.

16. The method of claim 15, wherein determining whether the first correlation and the second correlation satisfy a predetermined condition comprises determining whether the first correlation and the second correlation are sufficiently similar.

17. The method of claim 1, wherein determining whether the first correlation and the second correlation satisfy a predetermined condition comprises determining whether the first correlation and the second correlation both exceed respective threshold values.

18. The method of claim 17, wherein the respective threshold values are different.

19. A system for authenticating a speech signal received by a device comprising first and second transducers, wherein the first transducer comprises a microphone, the system comprising:

at least one input for receiving signals generated by the microphone and by the second transducer; and a processor configured for performing a method comprising:

performing a first voice biometric process on speech contained in a first part of the signal generated by the microphone, in order to determine whether the speech is the speech of an enrolled user;

determining a first correlation between said first part of the signal generated by the microphone and a corresponding part of the signal generated by the second transducer;

determining a second correlation between a second part of the signal generated by the microphone and the corresponding part of the signal generated by the second transducer, said second part different from said first part;

determining whether the first correlation and the second correlation satisfy a predetermined condition; and if it is determined that the speech contained in the first part of the received signal is the speech of an enrolled user and that the first correlation and the second correlation satisfy the predetermined condition, authenticating the received speech signal; and if it is determined that the speech contained in the first part of the received signal is not the speech of an enrolled user, not authenticating the received speech signal.

20. A computer program product, comprising non-transitory machine readable code containing instructions for causing an audio processing circuit to perform a method according to claim 1.

* * * * *